United States Patent [19]
Carter, Sr.

[11] 3,844,749
[45] Oct. 29, 1974

[54] HIGH VELOCITY FILTER

[75] Inventor: William E. Carter, Sr., Piedmont, S.C.

[73] Assignee: Thermo-Kinetics, Inc., Greenville, S.C.

[22] Filed: June 1, 1972

[21] Appl. No.: 258,484

[52] U.S. Cl................. 55/341, 55/276, 55/358, 55/378, 55/498, 55/501, 55/511, 55/DIG. 26, 55/DIG. 31
[51] Int. Cl............................ B01d 46/04
[58] Field of Search............ 55/340, 341, 342, 343, 55/346, 347, 350, 358, 365, 369, 371, 373, 378, 483, 484, 494, 495, 501, 502, 504, 506, 511, 516–519, DIG. 12, DIG. 31, DIG. 26; 248/99; 52/206; 98/30, 32

[56] References Cited
UNITED STATES PATENTS

| | | | |
|---|---|---|---|
| 1,012,122 | 12/1911 | Budil | 55/341 |
| 2,774,443 | 12/1956 | Slayter | 55/341 |
| 3,537,241 | 11/1970 | Wiegel et al. | 55/378 |
| 3,541,767 | 11/1970 | Cetzin et al. | 55/378 |
| 3,668,843 | 6/1972 | Westlin et al. | 55/511 |
| 3,710,552 | 1/1973 | Genton | 55/341 |

*Primary Examiner*—Frank W. Lutter
*Assistant Examiner*—David L. Lacey
*Attorney, Agent, or Firm*—Bailey & Dority

[57] ABSTRACT

A filter section for use in a high velocity air handling assembly includes a transverse grid formed by intersecting metallic structural members defining openings accommodating the open end of a plurality of sock filters, with sealing means for attaching the open ends to the grid, structural means securing the grid about marginal portions across the assembly housing so that the grid serves as lateral bracing for the housing and as a support for the sock filters, and support means carried by the grid for the sock filters either in the form of elongated wire mesh housings or elongated rectangular open ended boxes.

4 Claims, 8 Drawing Figures

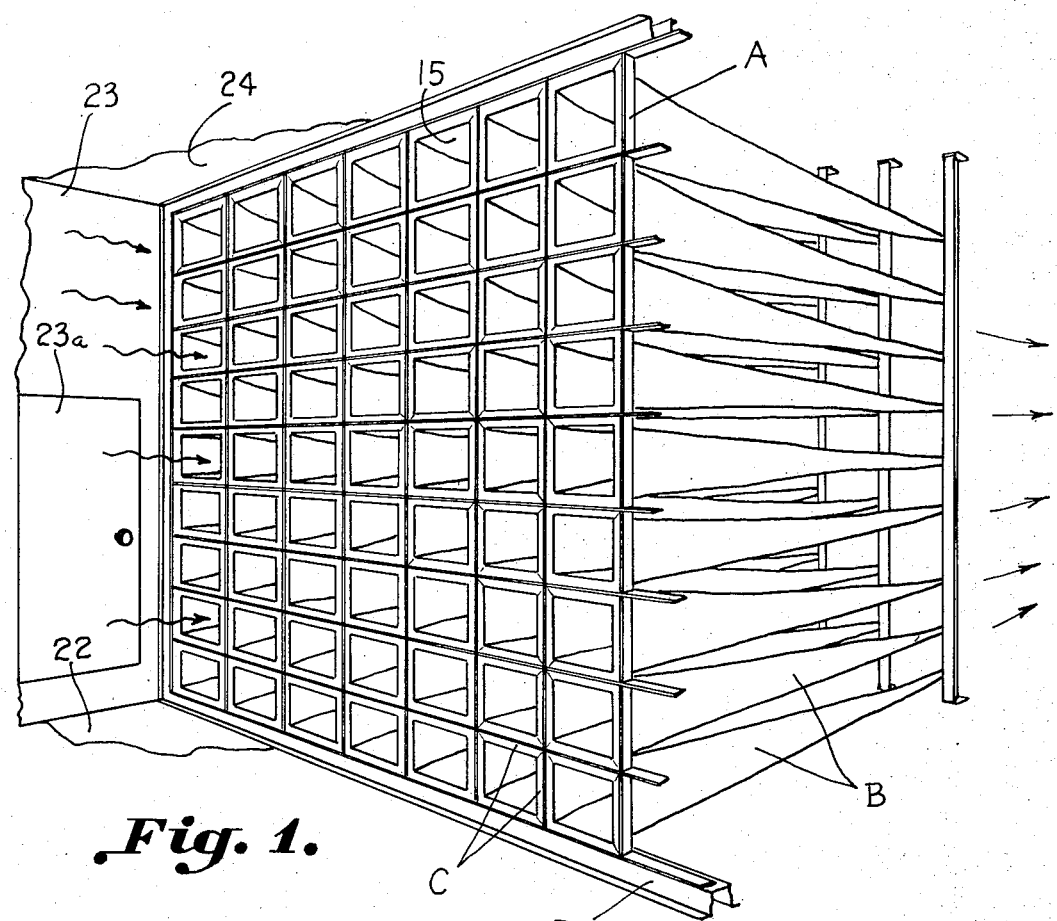
Fig. 1.
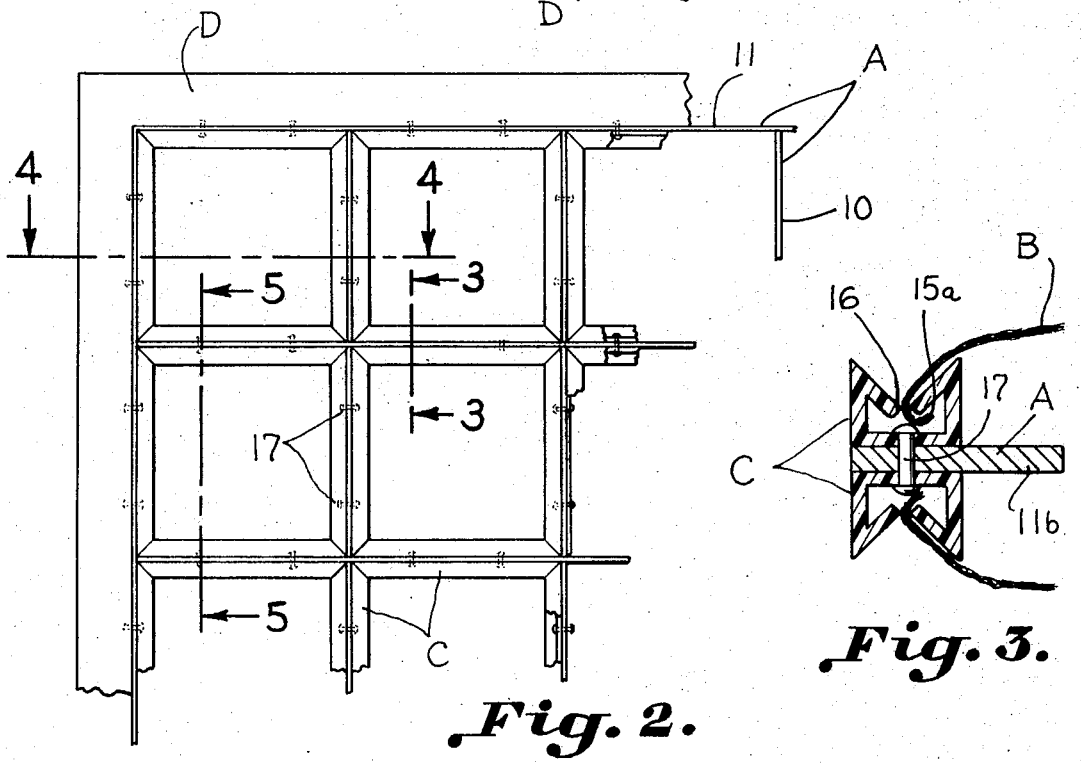
Fig. 2.
Fig. 3.

HIGH VELOCITY FILTER

BACKGROUND OF THE INVENTION

Bag filters have long been used for the purpose of increasing the filter area at a given location. U.S. Pat. Nos. 2,774,443; 2,853,154; 3,276,190 and 3,392,846 are exemplary of such structures. Such filters have, heretofore, been impractical in high velocity air handling systems of the type illustrated in U.S. Pat. No. 3,392,655 wherein high efficiencies and fan velocities are required. Drum filters or V-cell filters have heretofore been used in the large industrial air handling applications.

Accordingly, it is an important object of this invention to provide a filter for operation at high efficiencies at high fan velocities in industrial air handling units.

Another important object of this invention is to provide a novel mounting configuration to accomplish the foregoing objective with a relatively low pressure drop.

Another important object of this invention is to provide a mounting structure offering minimum surface area to restrict air flow and at the same time function as lateral bracing to support the housing of the unit where space limitations are critical.

Still another object of the invention is to provide a filter of the foregoing type wherein the filter medium is easily changeable.

SUMMARY OF THE INVENTION

It has been found that a transverse grid formed by intersecting flat metallic structural members forms a support for sealing strips for attaching the open base portions of sock filters and serves as lateral bracing for the housing. Support means may be carried by the grid either in the form of elongated wire housings or elongated rectangular open ended boxes which serve to attenuate sound.

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a perspective view illustrating a high velocity filter constructed in accordance with the present invention positioned in the housing of an industrial air handling unit, FIG. 2 is an enlarged front elevation of the upper left-hand portion of the filter shown in FIG. 1, FIG. 3 is an enlarged transverse sectional elevation taken on the line 3—3 in FIG. 2 illustrating the sealing strip for carrying the filter medium, FIG. 4 is a sectional plan view taken on the line 4—4 in FIG. 2 further illustrating the supports for the filter medium;

FIG. 5 is a transverse sectional elevation taken on the line 5—5 in FIG. 2 further illustrating supports for the filter medium, FIG. 6 is a perspective view illustrating the grid supports for the sealing strips and lateral bracing, FIG. 7 is a sectional plan view, similar to FIG. 4, illustrating a modified support structure for the filter medium; and FIG. 8 is a sectional plan view, also similar to FIG. 4, illustrating another modified support structure for the filter medium.

DESCRIPTION OF PREFERRED EMBODIMENTS

The drawings illustrate a high velocity air handling assembly as for conditioning air in industrial plants, which permits entry by service personnel within the assembly, having a housing carried by a structural base. A filter section includes a transverse grid A formed by intersecting flat metallic structural members defining a plurality of intersecting rows of aligned closely adjacent openings. The openings have sides conforming generally to the configuration of the opening of the base of a sock filter. The structural members define longitudinally disposed flanges. A plurality of elongated sock filters B each have an open base on one end tapering inwardly therefrom toward and being closed on the other end. Sealing strips C are carried by the metallic structual members about the sides for attaching individual base portions of the sock filters about said sides so that the bases of the sock filters are open for receiving high velocity air. Structural means D secures the grid about marginal portions thereof across the housing and the base so that the grid serves as lateral bracing for the housing and a support for the sock filters.

The structural members include horizontal flange portions extending longitudinally inwardly beyond the sealing means C for serving as a ledge to carry individual support means for the sock filters either in the form of an elongated longitudinal wire mesh housing E or an elongated longitudinal rectangular open ended box F.

Figure 6:
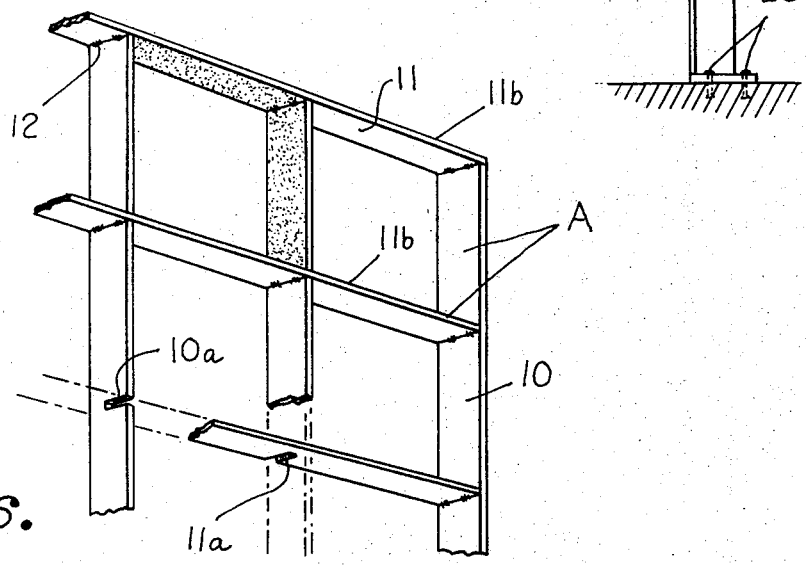

The transverse grid A is formed by intersecting flat metallic structural members 10 and 11. These members are best shown in FIG. 6 where it will be noted that the vertical members 10 each have spaced horizontal notches 10a which co-operate with spaced notches 11a in the horizontal members so that the members 10 which define longitudinal vertical flanges, as shown by the shaded section in FIG. 6 and 11 which define longitudinal horizontal flanges, as shown by the shaded section in FIG. 6 are aligned in the same transverse plane. The intersecting portions of the structural members 10 and 11 are suitably secured together as by tack-welding as at 12.

The sock filters 13 include triangularly shaped elongated side portions 13, which taper inwardly and are closed on one end as at 14. Each of the sock filters define an open end base portion 15 at the other end. The filter medium may be of a non-woven polyester mat, but any suitable filter material may be used.

Sealing means C in the form of zipper strips have the usual opening 16 for the reception of marginal portions 15a of the sock filters (FIG. 3). The zipper strips are secured as by means of pop rivets 17 at spaced points both to the horizontal structural members 11, as well as the vertical structural members 10 (FIG. 2). The securing or zipper strips are preferably of the type illustrated in U.S. Pat. No. 3,293,834.

The structural members D secure the grid about marginal portions across the housing. The structural means include horizontal and vertical sections, each of which has a channel portion 18 which carries insulation 19. The channel members each have outwardly extending legs 20 which are pop riveted as at 21 to the floor 22, sides 23 and ceiling 24. It will be noted that the wall 23 includes a door 23a to permit entry by personnel. The floor is structurally reinforced and the housing including the walls and ceiling may be of the type illustrated in U.S. Pat. No. 3,392,655.

Figure 4:
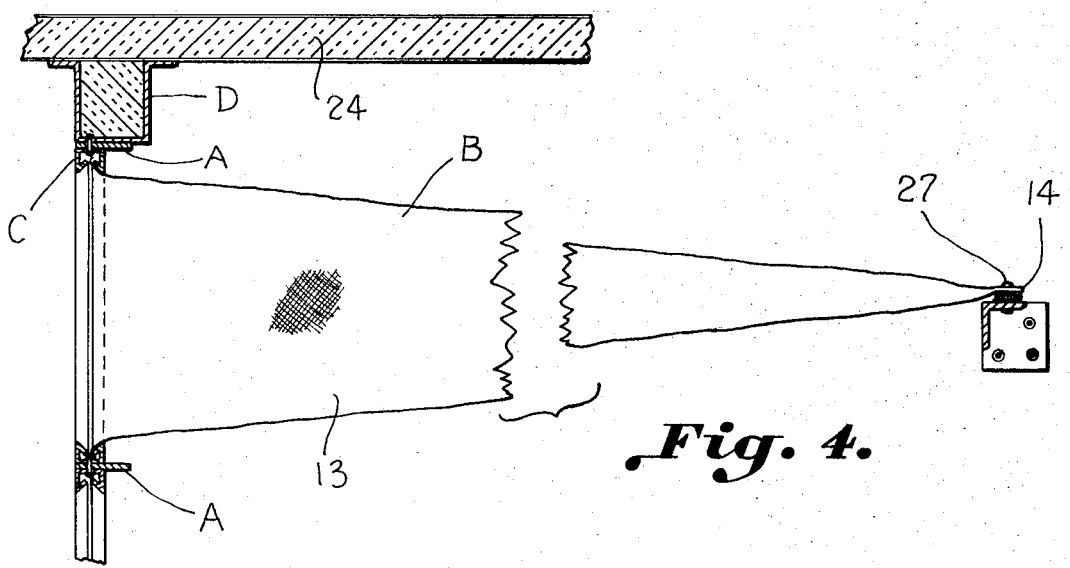
Figure 5:
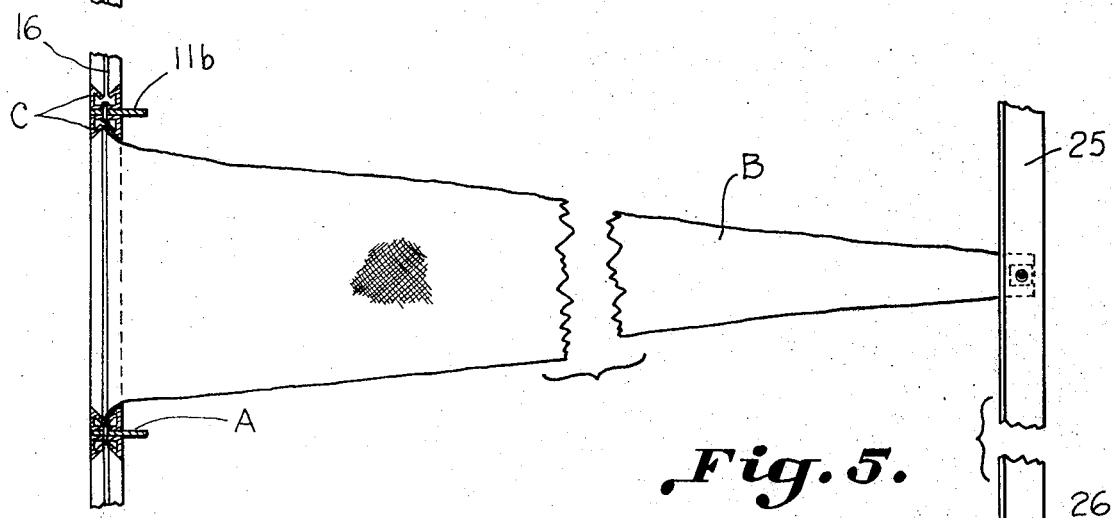

It will be noted by reference to FIGS. 1, 4 and 5 that vertical channel shaped supports 25 are suitably secured at the floor 22 and the ceiling 24 as by rivets 26. Fastening means, as illustrated at 27, are spaced for securing the sealed ends of the sock filters thereto to avoid excessive flapping motion.

Figure 7:
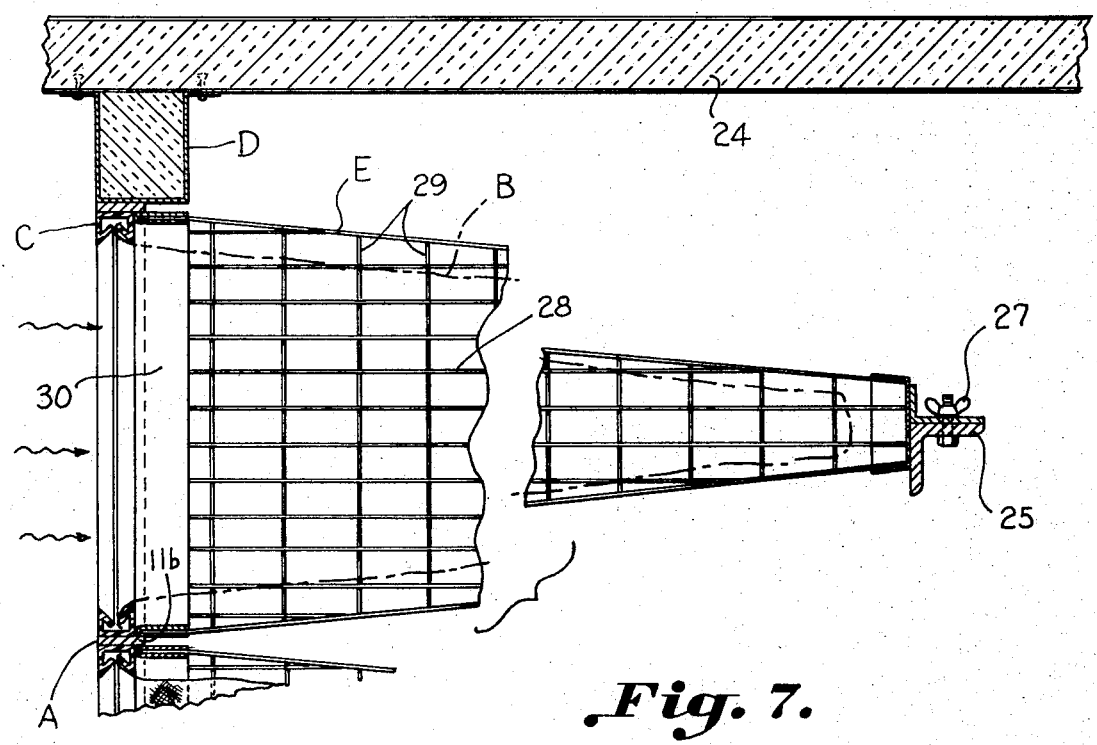

With reference to FIG. 7, it will be noted that the wire mesh housing E has a plurality of horizontal wires 28 and a plurality of vertical wires 29. The wire basket thus formed tapers generally conforming to the sock filter and an open end conforming to the opening of the sock filter is defined by a sheet metal hem 30. The horizontal members 11 support strip fastening members C and extend inwardly therefrom as horizontal flanges 11b to support the hem 30. The other ends of the baskets are supported as by vertically spaced supports 27.

Figure 8:
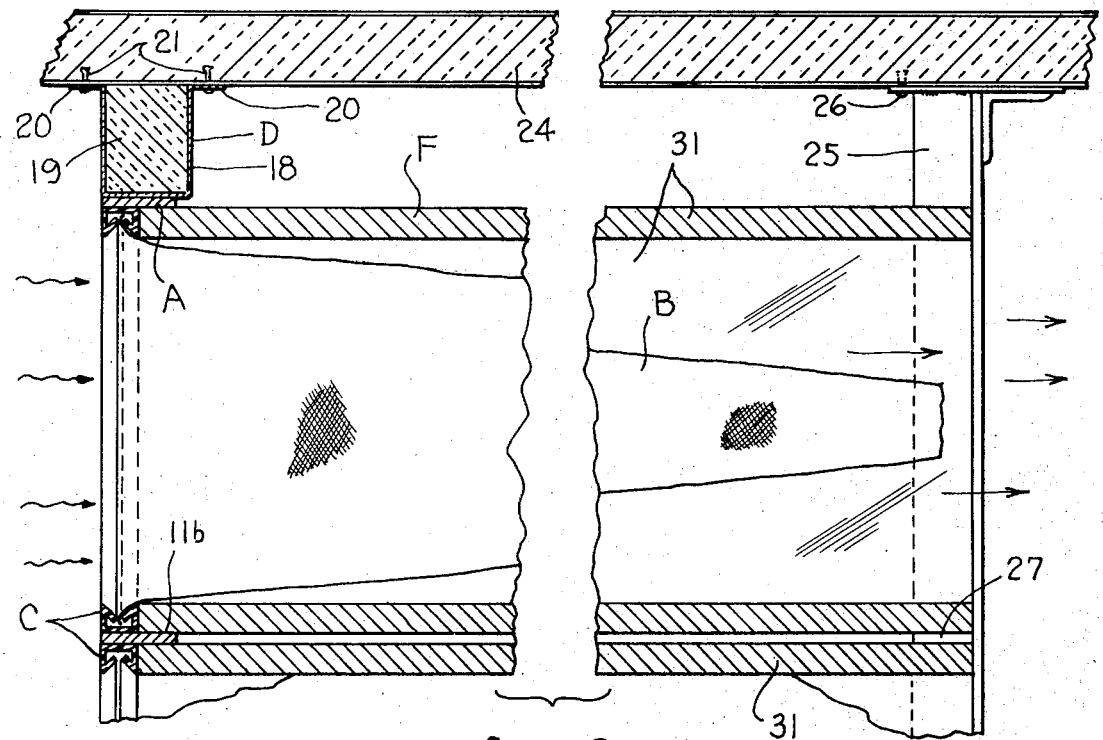

FIG. 8 illustrates an accoustical support for the filter medium. A plurality of elongated open ended substantially rectangular boxes F of substantially uniform cross-section receive individual sock filters. One end of these boxes may be supported on flanges 11b, while the other end is supported as by vertically spaced supports 27. Preferably, the boxes are of rectangular cross-section having rectangular sides 31. The boxes are also preferably constructed of accoustical material, such as fiberglas. The boxes straighten the air flow path through the air handling assembly and attenuating sound passing therethrough.

The changing of the sock filters simply consists of removing the spent medium and then sliding a fresh sock through the square opening 15. Personnel may gain entrance to the housing through the door 23a for this purpose. The leaving end of the socket is attached to a support 27 on the leaving side and the open end of the sock is rolled into a zipper lock. This is done quickly and is easily accomplished while the system is in operation.

While a preferred embodiment of the invention has been described using specific terms, such description is for illustrative purposes only, and it is to be understood that changes and variations may be made without departing from the spirit or scope of the following claims.

What is claimed is:

1. In a high velocity air handling assembly as for conditioning air in industrial plants which permits entry by service personnel within the assembly having an insulated housing carried by a structural base, a filter section comprising: a transverse grid formed by intersecting flat longitudinal metallic structural members defining a plurality of intersecting rows of aligned closely adjacent openings, said openings having inner sides conforming generally to the configuration of an opening of a sock filter; said structural members defining longitudinal vertical and longitudinal horizontal flanges; a plurality of elongated sock filters having an open base on one end tapering inwardly therefrom toward and being closed on the other end; sealing strip means carried by said metallic structural members about said inner sides for attaching individual base portions of said sock filters entirely about the base, entirely about said sides so that the bases of said sock filters are open for receiving high velocity air; and structural means securing said grid about marginal portions thereof across said housing and said base so that said grid serves as lateral bracing for said housing and as a support for said sock filters.

2. The structure as set forth in claim 1, wherein said structural members include horizontal flange portions extending longitudinally inwardly of said sealing means for serving as a ledge.

3. The structure set forth in claim 2, including support means having an elongated longitudinal wire mesh housing conforming generally to said sock filters disposed thereabout.

4. The structure set forth in claim 2, including an elongated longitudinal rectangular open ended box of substantially uniform cross-section receiving said sock filters supported by said flange portions.

* * * * *